Dec. 7, 1937.  N. B. LUND  2,101,079
SEDIMENTATION APPARATUS
Filed Oct. 3, 1934  4 Sheets-Sheet 2
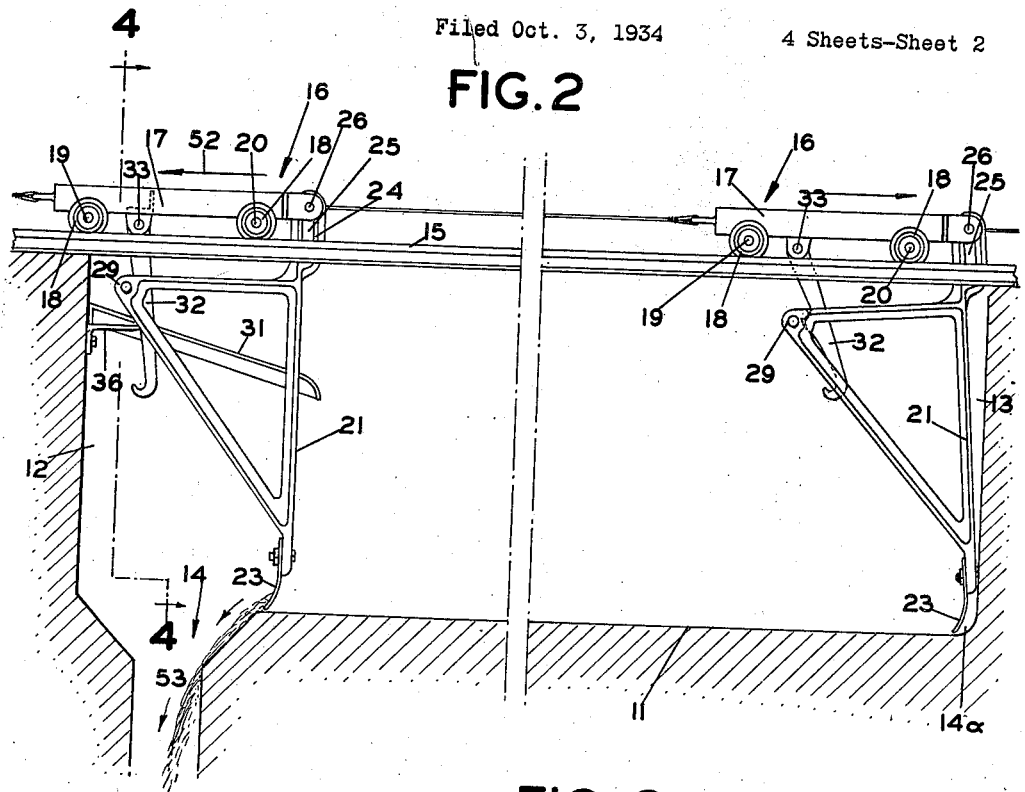
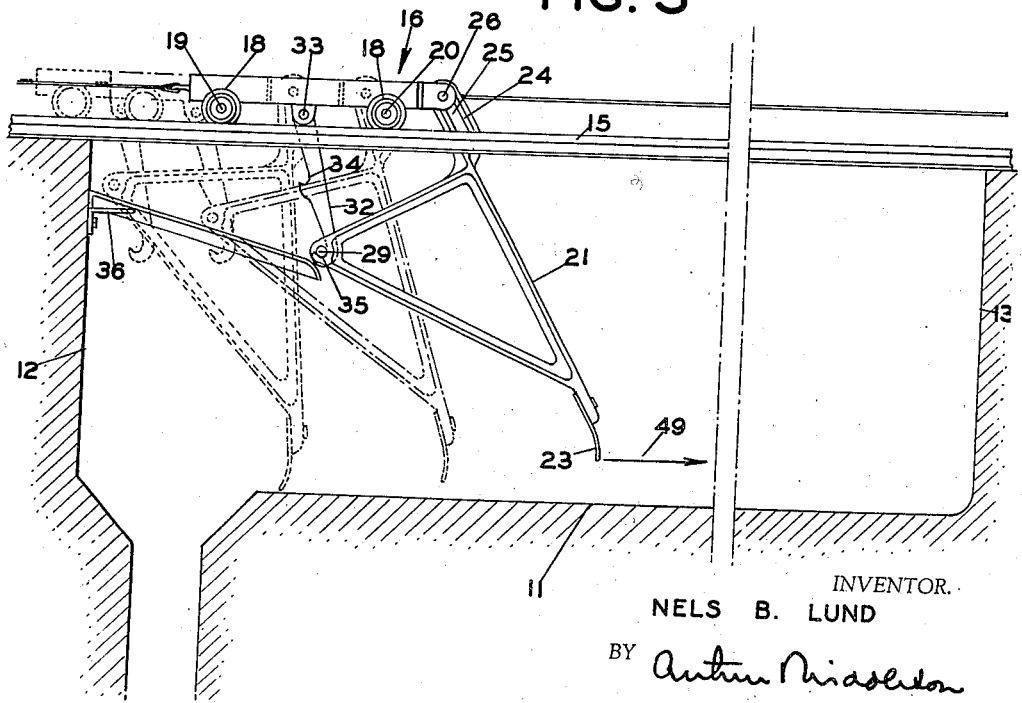
INVENTOR.
NELS B. LUND
BY Arthur Middleton
ATTORNEY.

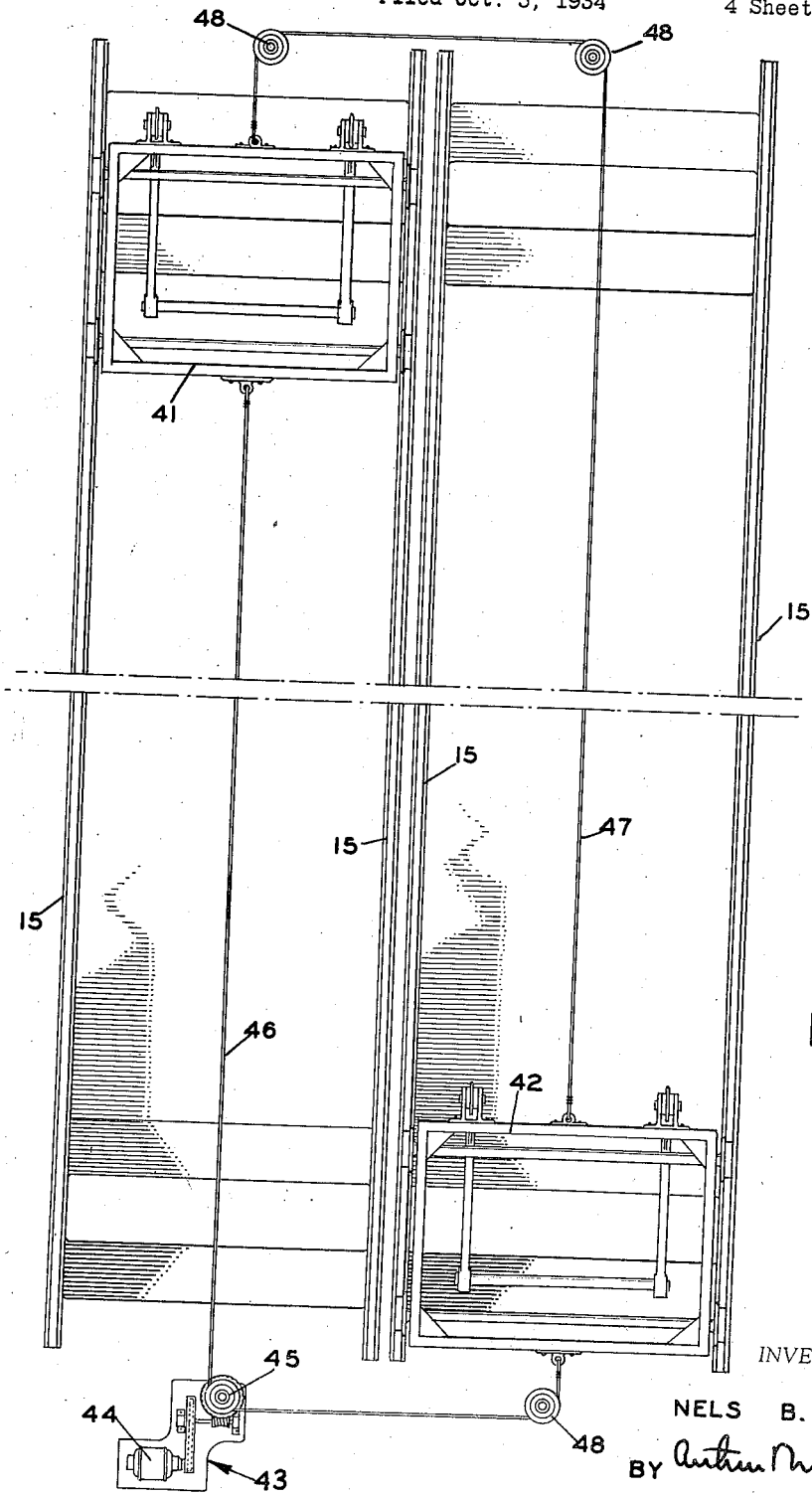

Dec. 7, 1937.                    N. B. LUND                    2,101,079
                           SEDIMENTATION APPARATUS
                            Filed Oct. 3, 1934          4 Sheets-Sheet 3

INVENTOR.
NELS B. LUND
BY
ATTORNEY.

Dec. 7, 1937.   N. B. LUND   2,101,079
SEDIMENTATION APPARATUS
Filed Oct. 3, 1934   4 Sheets-Sheet 4

INVENTOR.
NELS B. LUND
BY Arthur Middleton
ATTORNEY.

Patented Dec. 7, 1937

2,101,079

UNITED STATES PATENT OFFICE 2,101,079

SEDIMENTATION APPARATUS

Nels B. Lund, Seaford, N. Y., assignor to The Dorr Company, Inc., New York, N. Y., a corporation of Delaware Application October 3, 1934, Serial No. 746,676

15 Claims. (Cl. 210—55)

This invention relates to conveying mechanisms for sedimented solids and particularly to the type of mechanism which operates in reciprocating fashion in connection with rectangular sedimentation or clarification tanks.

More specifically this invention is concerned with improvements in a reciprocating mechanism in which a sediment collector or frame or member extends into the tank and is actuated from the top of the tank as by a reciprocating carriage from which the frame is movably suspended. The frame is movable between operative and inoperative positions upon the carriage so as to enable it to convey sediment over the tank bottom in a one way fashion as the carriage reciprocates.

While the preferred embodiment discloses the invention in connection with a one way operating mechanism preferably having automatic carriage reciprocation, it should be understood that the invention is not confined to such type but that features thereof may also be applied to other types for instance a double acting type which is capable of conveying sediment in both directions of carriage travel.

Objects of this invention are to produce a device of the character indicated, which has no submerged sensitive parts or bearings, which is simple and rugged, which is inexpensive and has a minimum of parts or moving elements, which is reliable in operation and capable of handling safely excessive or uneven quantities of settled solids, and which is arranged to cover the tank bottom efficiently and without taking up idle space in the tank.

There is a tendency toward tipping the carriage when the collector frame is under sediment load during its active movement. So another object is to design a device in which such tendency is reduced or eliminated. Still another object is to render easily accessible the submerged or sediment collecting portion of the device.

Important features of this invention are concerned with improvements in the kinematics, actuation, and operation, and also with the structure of a sediment conveying frame or screed structure which is rendered active and inactive respectively in unison with changes in the carriage movement.

According to one feature the collector frame is movably suspended from the carriage in a manner to be operable between operative and inoperative angular positions. The frame is held inoperative by suitable means until an obstruction or resistance in the path causes the frame to be swung into operative position against the pressure of said means. Accordingly the frame in its inoperative angular position may be allowed to protrude or extend in the direction of its idle traveling movement and to engage directly upon a stationary abutment, such as the end wall of the tank itself, thereby automatically positioning the frame for the subsequent operative return stroke. The direct action upon the sediment collector or frame makes unnecessary any special intermediate mechanism for that purpose. According to another feature the collector frame is so balanced that in cooperation with certain anchoring means it will seek and hold its respective operating positions.

Another feature relates to the return of the collector frame from inactive to active position. This movement of the frame is controlled so that the frame is reset at a rate corresponding to the rate of carriage movement, to enable a sediment collecting member for instance a screed at the lower end of the frame to scoop out sediment from the lower end corner of the tank.

Another feature provides a movable or lost motion connection between the collector frame and its supporting carriage for reducing or eliminating the tendency of the sediment load to unbalance or tip over the carriage. The frame is allowed a give or movement which makes it impossible to overload it for the screed will only take as much sediment as its weight and position will permit. More specifically, the frame is suspended from the carriage at two points spaced from each other along the line of carriage movement. Each suspension connection is of a kind to permit movement of the collector frame. In other words each suspension connection may serve periodically as a pivotal center for the collector frame in order to establish the proper active or inactive positions thereof.

According to another feature, the sediment collector is in the form of an angular frame which is fulcrumed at the apex portion of its angular structure upon the carriage. One extremity of the frame carries the sediment collecting screed member or the like, the other free end serves to anchor the frame in operative and inoperative positions respectively, upon the carriage.

Still another feature relates to the manner of mounting the collector frame upon the carriage, by which the frame can be expeditiously and conveniently raised from submergence and be made readily accessible. Accordingly, a simple mounting is such as to permit an upward swing of the frame substantially past the horizontal and preferably further around past the point of unstable equilibrium, and to have the emerged frame bodily and directly sustained on top of the carriage. To this end the frame is pivotally suspended from an extremity of the carriage preferably located outside the wheelbase thereof. A detachable or releasable bracing connection between the frame and the carriage extends in the direction toward the other carriage end. Upon the release of this connection, the frame can be manipulated in the manner indicated above.

According to a preferred embodiment of the invention, an angular or triangular collector frame is hinged or fulcrumed upon the carriage by way of a lost-motion or slip connection. When the frame is inactive this suspension acts as a true pivot and the angular position of the frame is such that the screed end thereof is raised off the vertical in the direction of its idle traveling movement or stroke. During the final phase of this movement an obstruction in the path of the frame may engage upon the screed end thereof and urge or swing the frame back into operative position relative to the tank bottom, at the same time moving the opposite or free end of the frame into anchoring or movable latch engagement with the carriage, whereupon the active traveling movement or stroke can begin through reversal of the carriage. In this condition, the lost motion connection may become effective to allow the frame to rise according to the weight of the sediment load upon the screed while still maintaining bearing contact with the carriage.

At the end of the sediment conveying stroke, a stationary abutment may force the anchoring latch out of engagement, thereby releasing the free end or arm of the angular frame, which allows it to drop. Snubbing or guide means may dampen such drop to prevent undue stirring of the liquid in the tank.

The sediment collector or frame is hinged upon one extremity of the carriage so that after disengagement from the anchoring means, the frame may be swung up and past the horizontal by hand or by suitable auxiliary means out of submergence and thus be made readily accessible for overhauling or replacing or removing the carriage from the tank whenever it is desired. The preferred embodiment also lends itself to the use of a rope or cable drive for actuating the carriage. The carriage during its sediment conveying movement is preferably impelled from its leading end while the trailing end carries the collector frame in operative position, since there may thus be obtained a favorable disposition of the forces acting and reacting upon carriage and collector frame.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 is a plan view showing a twin tank in which the devices for both tanks are actuated by a common rope drive.

Fig. 2 is a longitudinal section of the tank showing the sludge collector in its respective sludge conveying end positions.

Fig. 3 is a longitudinal section similar to Fig. 2 illustrating the changing of the sludge collector from active to inactive position.

Figure 4:
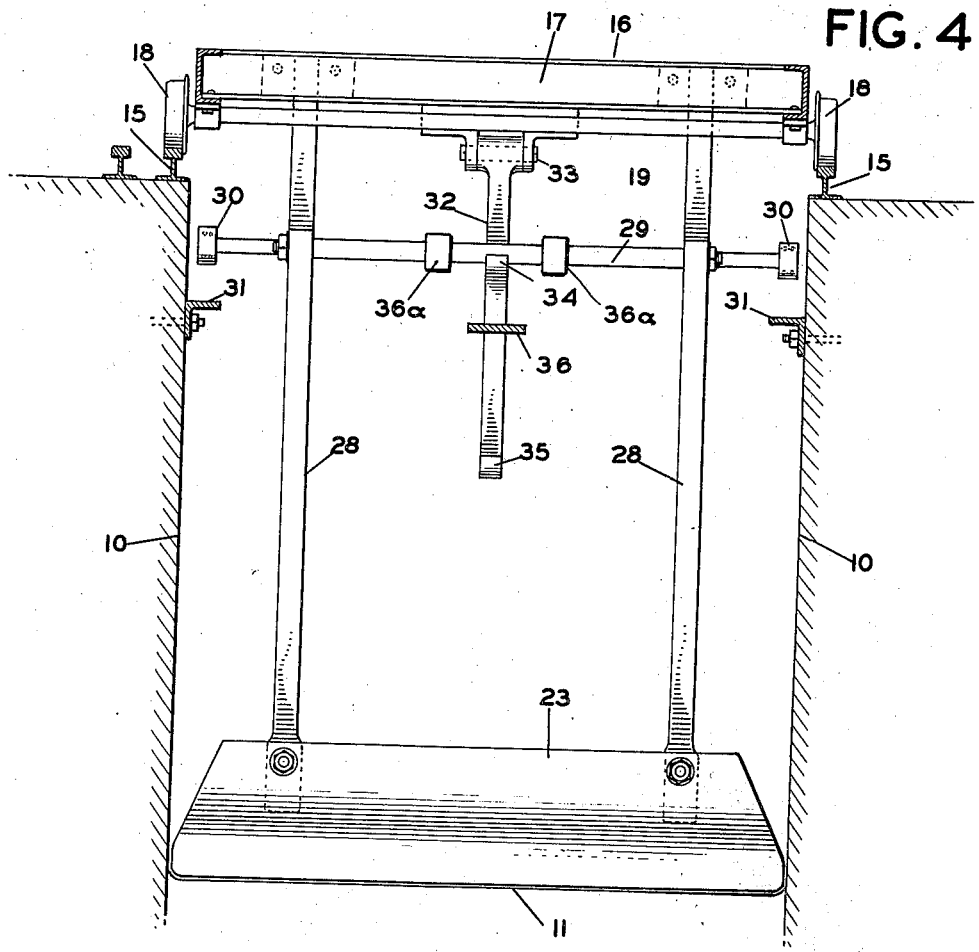
Fig. 4 is a cross-section showing a front view of the sludge collector, and the latch member holding the collector operative.

The longitudinal sedimentation tank comprises sidewalls 10, a bottom 11, a front wall 12, and a rear wall 13. A sludge sump or outlet 14 is located at the front end of the tank. The rear bottom corner of the tank is of a certain well rounded shape and indicated by the numeral 14a. The sidewalls carry track rails 15 upon which may operate the rope driven travelling carriage 16 which is reciprocable for conveying sludge over the bottom to the sludge outlet. The carriage is shown to comprise a frame 17, track rollers 18 mounted on front and rear axles 19 and 20 respectively. A sludge collector frame 21 is suspended as by brackets 22 from the carriage frame into the tank and is shown to carry at its lower end a sludge collecting blade or screed 23. The collector frame in its lateral view is of triangular shape as shown in Figs. 2 and 3 having a horizontal and a vertical shank portion and at its apex portion it is shown to be formed with loop portions 24 to form a lost motion connection 25 with pivots 26 mounted in the brackets 22 upon the trailing end 27 of the carriage frame. The collector frame 21 in fact comprises two lateral triangular structures 28 (as seen from Fig. 4) interconnected by suitable bracing members among which there are the screed 23 at the bottom, and a transverse tie rod 29 at the front corner of the collector frame 21. This rod 29 has end portions protruding laterally beyond the triangular structures 28 and carries at each free end a guide roller 30 which rollers are rendered active at the one end phase of the carriage movement when they are allowed to engage upon stationary guide rails 31 mounted upon the inner face of each side wall of the tank at the sludge outlet end thereof. The front end of the sludge collector frame is arranged to cooperate with a depending latch or anchoring member 32 which is pivoted at 33 to the carriage frame. This latch member has an upper and a lower hooked portion 34 and 35 which are to determine the operative and inoperative positions respectively of the collector frame at the respective end phases of its stroke. An abutment member 36 (see Figs. 2, 3, and 4) is fixed upon the front end wall 12 of the tank and is effective to disengage the latch member 32 from the collector frame at the end of the sludge discharge phase. A desired weight balance of the collector frame is effected as by weights 36a.

Figure 7:
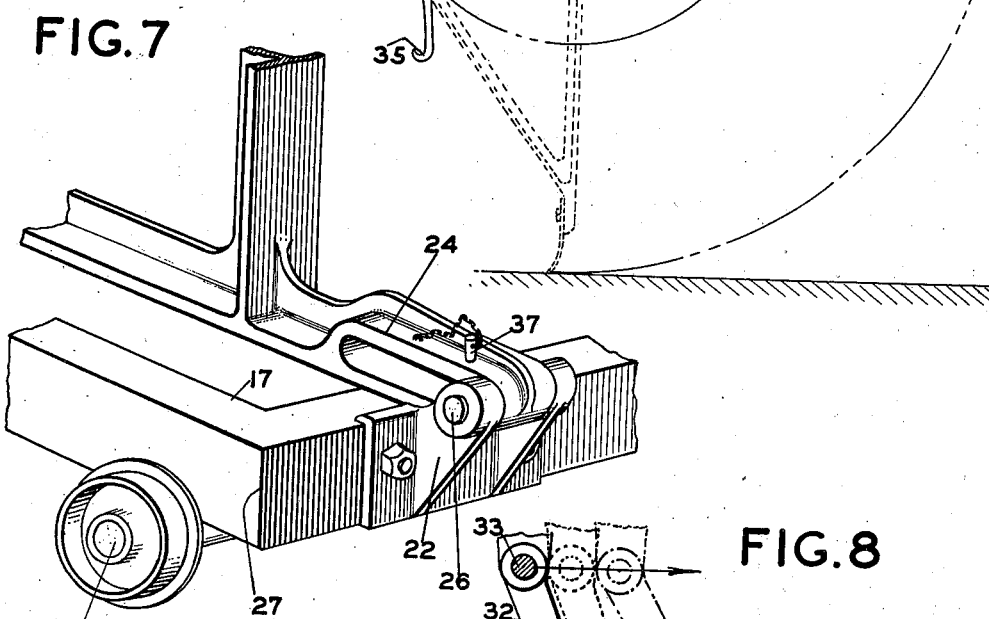
Fig. 7 is a perspective detail of the rear portion of the carriage with the sludge collector hinged thereto substantially as in Fig. 6, showing means for restricting lost motion during withdrawal.

The detail of Fig. 7 shows that a potential movement of the collector frame due to its lost motion connection at its suspension point, may be confined at will to substantially true pivotal movement as by a removable plug 37 for instance when the collector frame is to be lifted out of the tank into the Fig. 7 position.

Figure 8:
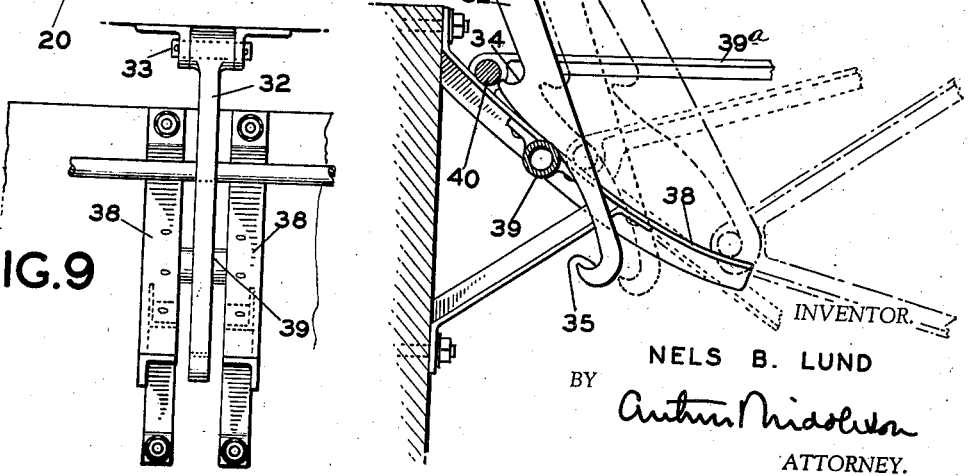
Figs. 8 and 9 show modified detail structure illustrating the phase of latch disengagement of Fig. 3 which renders the sludge collector inoperative.
Figure 9:
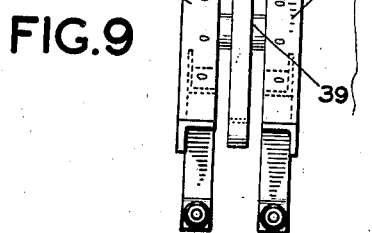

Figs. 8 and 9 disclose a modified and more unitary structure effective to disengage the latch member 32, and which may be substituted for the more scattered arrangement of the guide rails 31, the guide rollers 30, and the abutment member 36. The modified unitary structure is centrally arranged upon the front end wall 12 in the form of a bracket structure which comprises two freely projecting parallel guide members 38 spaced apart to afford entrance therebetween of the latch member 32. A cross piece 39 connects the guide members 38 midway and bridges the space therebetween to serve as a stop or cam member for the latch member 32. In Fig. 8 the collector frame is indicated by its broken off front corner portion 39a and which comprises the transverse tie rod 40.

Fig. 1 shows the plan view of a twin tank arrangement, using a single rope drive to operate in alternate fashion the carriages 41 and 42. The rope drive is shown to comprise the driving mechanism 43 including the motor 44 and driving drum, pulley or sheave 45, the rope sections 46 and 47, and the driven pulleys or sheaves 48. Suitable automatic means (not shown) may be provided to effect the automatic reiprocation of the mechanism at the proper times.

*Operation*

Figure 5:
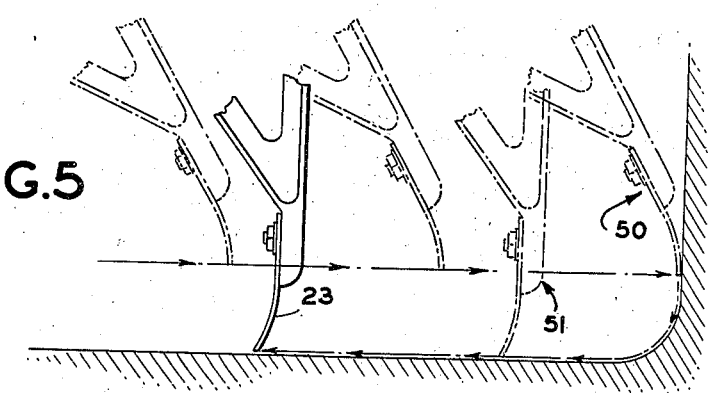
Fig. 5 is a detail to illustrate the manner in which the sludge collector is reset from inactive to active position at the end of an idle return stroke.

Beginning the cycle of operation with the position shown in Fig. 3, the collector frame 21 is poised in inoperative angular position, that is to say with the screed 23 lifted off the bottom in a direction pointing towards the rear wall 13 of the tank, this inoperative or idle travelling position being determined by the transverse tie rod 29 being engaged and sustained by the lower hook portion 35 of the pivoted latch member 32. Suitable weight 36a or other means may be provided to secure this engagement as long as is desired in the cycle of operation. With the sludge collector held in this inoperative position the carriage driven by the rope 46 or 47 respectively is to travel towards the rear end of the respective tank as indicated by the arrow 49 (see Fig. 3). In approaching the rear wall 13 the sludge collector 21 is caused to go through a characteristic phase during which it is reset to operative or sludge conveying position. This important phase is most clearly illustrated in the detail view of Fig. 5. That is to say the screed 23 is caused to engage in camming contact upon the rear wall 13 as indicated at 50, and with the carriage continuing through its final phase of travel is forced back against the resistance of weight pressure or other suitable detent mechanism into the operative position indicated by the numeral 51. While the screed 23 or lower end of the sludge collector is thus being reset, the upper end or tie rod 29 is caused to slide upwardly along the latch member 32 until it catches upon the upper hook portion 34 thereof, which in turn determines and maintains the operation or sludge conveying position of the collector 21. In this manner the sludge collector resets itself by direct contact with limitation of its travelling movement and thus requires no additional intermediate lever or resetting mechanism. It is also to be noted that during the resetting period of the sludge collector the screed 23 is caused to scoop out the rounded rear bottom corner 14a of the tank so that no objectionable sludge will remain therein. An intermediate position during the resetting phase is seen at the right hand end of Fig. 2. It can be seen that the resetting leverage exercised in this manner upon the collector frame is very favorable. By suitable automatic mechanism (not shown) the subsequent return of the carriage may be synchronized with the resetting movement of the sludge collector 21 in such a manner that the reversal of the carriage movement is effected as soon as the collector 21 has been secured in its operative position ready for its working stroke.

Conveying sludge in the direction of arrow 52, according to Fig. 2, the sludge collector 21 will reach the forward or front end of the tank where the screed 23 pushes the collected sludge load 53 into the sump or sludge outlet 14.

Thereafter the collector 21 must be returned to its inoperative angular position. Therefore arrangement is made for the carriage movement to cause at the proper moment the latch member to engage upon the abutment member 36 at the front end 12 of the tank, continued final carriage movement being effective to force the latch member 32 out of engagement with the tie rod 29 thereby permitting the front corner of the collector frame to drop and the guide rollers 30 thereon to engage upon the sloping guide rails 31. At this time the carriage movement will again be reversed while the guide rollers 30 move down the rails thereby allowing the collector to swing again into its inoperative angular position gradually and without undue stirring of the surrounding liquid. This position is again determined when the tie rod 29 re-engages upon the lower hooked portion 35 of the latch member 32.

It should further be noted that provision is made against overloading the sludge collector during its operative stroke. That is to say the lost motion connection 25 between the collector 21 and the carriage frame permits the screed 23 to override undue sludge accumulations or obstacles thus providing that the mechanism will convey not more than a predetermined load maximum.

After the foregoing the essence of a kinematic principle involved might be summarized by saying that this is a matter of changing or shifting the pivotal center of the collector frame. That is to say, for the inoperative or idle travelling position of the collector frame 21 the pivot 26 functions as the main pivotal center. However after the operative or sludge conveying position has been restored the collector frame appears to be substantially suspended from two points. Nevertheless an effective pivotal center of the system has shifted forwardly to the anchoring member 32 inasmuch as the lost motion connection leaves the rear end of the collector frame free to rise under load pressure. It is also noted that under some operating conditions the movable anchorage of the collector frame relative to the carriage permits of bodily movement of the entire collector relative to the carriage frame.

Figures 8 and 9 are substantially self-explanatory in that they illustrate a more compact structural combination of the guide and abutment means which cause the repositioning of the collector frame from operative to inoperative position.

Figure 6:
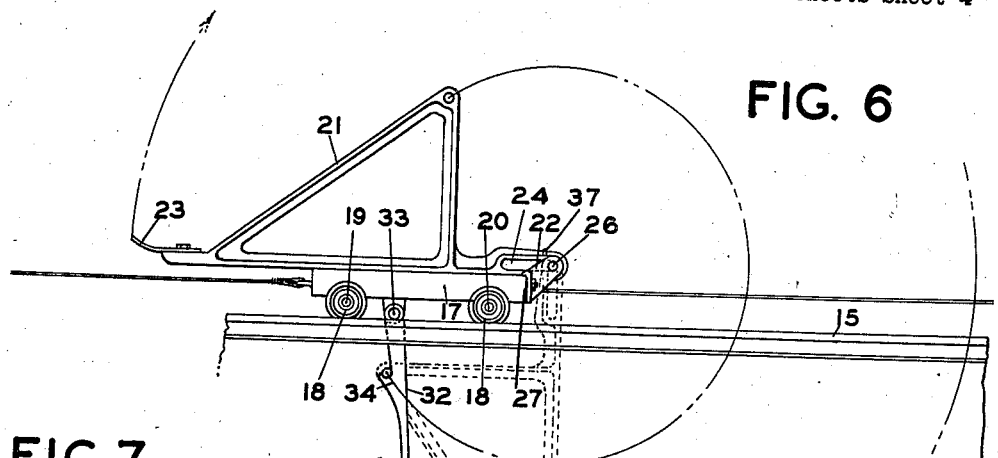
Fig. 6 is a side view upon the carriage to illustrate the withdrawal of the sludge collector from immersed position to a point above the tank.

Figs. 6 and 7 illustrate the feature that the sludge collector can be moved entirely out of the liquid and when withdrawn be caused to repose on top of the carriage frame in which position it may be readily mounted, dismounted, or overhauled while freely exposed and accessible; or the carriage with the collector thereon may be removed entirely to a point outside of the tank. Prior to withdrawing the collector frame 21 from the tank the plugs 37 are placed to block the sliding movement which is due to the lost motion connection 25. In this way the lost motion is confined to mere pivotal movement of the collector frame about the pivots 26 whenever the collector is to be swung upwardly and past the line of unstable equilibrium into a position (see Fig. 6) where it is allowed to repose directly in upside down position upon the carriage frame, whereupon the collector frame can be overhauled or dismounted. Similarly it is clear that with this arrangement a collector frame can be readily mounted or replaced upon the carriage frame by first placing it onto the carriage frame in the position shown in Fig. 6, and by then establishing the pivotal connection with the rear end of the carriage frame, and then lowering the sludge collector into the tank by swinging it about the rear end of the carriage and lowering it into the liquid. The plugs 37 may then be removed and the collector be left free to operate. In connection with this manipulation it should be understood that the driving rope 41 may be detached from the rear end of the carriage in order to clear the way for the passage of the collector frame 21 while the same is manipulated in the manner just described with respect to Fig. 6; or a rope drive may be employed which is designed to engage with equal force upon each side of the carriage, and adapted to leave a clearance between the ropes, adequate for the passage therethrough of the sludge collector 21.

According to a duplex tank arrangement shown in Fig. 2 it is possible always to have one sludge collector under load so that there is no idle movement or load free movement for the driving mechanism.

I claim:

1. In a sediment-collecting reciprocating mechanism for settling tanks, a carrier operable in reciprocating fashion along a predetermined path along the top portion of the tank, a sediment-collector frame pivotally suspended from said carrier to depend into the tank and movable in a controlled manner between angular positions in a manner to convey sediment along the tank bottom while traveling in the one direction, and to run idle in the other direction, pressure means directly and continually acting upon said pivoted collector frame for holding the same substantially poised and swung out from the bottom during its idle travelling movement, and means adapted during oppositely-directed travel to retain the collector in operative conveying relation to the tank bottom in counteraction to the pressure effect of said pressure means.

2. In a sediment-collecting reciprocating mechanism for settling tanks, a reciprocating carrier operable in reciprocating fashion along a predetermined path along the top portion of the tank, a sediment-collector frame pivotally suspended from said carrier to depend into the tank and movable in a controlled manner between angular positions in a manner to convey sediment along the tank bottom while travelling in the one direction, and to run idle in the other direction, pressure means directly and continually acting upon said pivoted collector frame effective to hold the same in inoperative angular position and swung away from the bottom during its idle travelling movement, means for returning the collector frame from idle to operative position in counteraction to the pressure effect of said pressure means, and a catch operable and effective to hold said collector frame in said operative angular position.

3. In a sediment collecting reciprocating mechanism for settling tanks, a frame depending into the tank and operable between operative and inoperative positions in a manner to convey sediment while traveling in the one direction and to run idle in the other direction, means for holding said frame inoperative during its idle travelling movement, and control means stationary with the tank and adapted to engage directly upon said frame for resetting the latter to operative position as the frame travels into contact with said control means.

4. In a sediment collecting reciprocating mechanism for settling tanks, a frame depending into the tank and operable between angular positions in a manner to convey sediment along the tank bottom while travelling in the one direction and to run idle in the other direction, means for holding said frame inoperative during its idle travelling movement and swung out from the bottom in the direction of such movement, an obstruction in the path of the frame and adapted to engage directly upon the frame along the projecting portion thereof for resetting the same to operative position during the final phase of the carriage movement.

5. In a sediment conveying reciprocating mechanism for settling tanks, a carriage adapted to travel along the top portion of the tank, a pivotally suspended frame depending from the carriage into the tank and adapted to convey sediment, said frame operable about its pivot between active conveying and inactive angular positions, a suspension connection between the carriage and the frame at the point of pivotal suspension thereof, which suspension connection is arranged to allow for uncontrolled substantially upward shifting movement of the associated suspended portion of said frame relative to the carriage from its normal suspended position, and anchoring means operatively effective between, and associated with, the carriage and a point upon said frame which is spaced from said point of pivotal suspension, in a manner to establish and substantially determine the normally active conveying position of the frame, and which anchoring means are arranged to remain effective as such when so associated irrespective of the uncontrolled shifting movement of the said first-mentioned suspended portion of the frame.

6. In combination with an elongated sedimentation tank, sediment conveying reciprocating mechanism which comprises a carriage having a carriage frame and adapted to travel along the top portion of the tank; an angular sediment conveying frame comprising an apex portion, one shank portion extending from the apex and adapted for cooperative sediment conveying relationship with the tank bottom, another shank portion adapted for engagement with the carriage frame and thus for establishing said sediment conveying relationship, said angular frame pivotally supported by its apex portion from the carriage and swingable about its pivot point between operative sediment conveying and inoperative angular positions; sediment engaging means provided at the free end of said first mentioned shank portion; a catch associated with said carriage frame and with said angular frame in a manner to be responsive to engage and hold the free end of said second mentioned shank portion in a predetermined position relative to the carriage frame when moved into said cooperative relationship therewith, to secure operative sediment conveying position of the angular frame; a controlled release for said catch; and means effective to establish said frame in its inoperative angular position.

7. In combination with an elongated sedimentation tank, a sediment-conveying reciprocating mechanism which comprises a carriage having a carriage frame, adapted to travel along the top portion of the tank, an angular sediment conveying frame having shanks arranged at substantially right angles to each other, said frame pivotally supported by its apex portion from the carriage and swingable about its pivot point between operative sediment-conveying and inoperative angular positions, said frame and said carriage adapted to convey sediment in one direction of travel and to run idle in the opposite direction, one of said shanks being arranged to extend substantially in the direction of the sediment-conveying travelling movement of the carriage, sediment-engaging means provided at the free end of the other shank of said frame, a catch associated with said carriage frame and said angular frame in a manner to be responsive to engage and retain the free end of said first mentioned shank in a predetermined position relative to the carriage when the shank is moved into cooperative relationship therewith, to establish the operative sediment conveying position of the angular frame; a controlled release for said catch; and means effective to establish said frame in its inoperative angular position.

8. In a sediment conveying reciprocating mechanism for settling tanks, a carriage comprising a carriage frame, adapted to travel along the top portion of the tank, an angular frame comprising a sediment collecting element at one end thereof, said angular frame hinged at its apex portion from a portion of the carriage located beyond the wheel base of the carriage, and operable between angular positions to convey sediment in one direction of travel and to run idle in the opposite direction, the opposite end of said frame extending in the direction of the sediment conveying travelling movement, and means for disconnectably anchoring the last mentioned end to the carriage to establish sediment conveying position when connected.

9. In combination with an elongated sedimentation tank, a reciprocating sediment-conveying mechanism for a liquid-containing settling tank, a carriage operable along the top portion of the tank and having a substantially horizontally-extending carriage frame, a sediment-collecting frame, means for pivotally supporting the same from a point adjacent one end portion of said carriage frame and adapted to be swingable, while immersed, between angular normal operative and inoperative positions by which it is conditioned to effect the one-way conveyance of sediment over the tank bottom corresponding to the reciprocating movement of the carriage, said means also arranged and adapted to permit pivotally-moving the collecting frame about said adjacent end portion of the carriage from immersion in the liquid to complete emergence into an out-of-function reclining position substantially upon the top of said horizontally-extending carriage frame, means for establishing said swingable frame in its normal inoperative angular position, a catch associated with said carriage frame and said angular frame in a manner to be responsive to engage and retain the free end of said first mentioned shank in a predetermined position relative to the carriage frame when the shank is moved into cooperative relationship therewith, to establish the operative sediment conveying position of the frame; a controlled release for said catch; and means effective to establish said frame in its inoperative angular position.

10. In a reciprocating mechanism for settling tanks, comprising a carriage operable along the top portion of the tank for one way conveyance of sediment, said carriage having a leading and a trailing end portion with respect to such conveyance, a sediment collecting frame hinged from the trailing end portion of the carriage, and a movable bracing connection comprising a link between the frame and a point upon the carriage which is spaced from the hinging point towards the leading end of the carriage, said link adapted and operable to maintain the frame in its respective operative and inoperative positions.

11. In a sediment-collecting reciprocating mechanism for settling tanks, a carriage having a carriage frame, adapted to travel along the top portion of the tank, a sediment-collecting frame depending from the carriage into the tank, sediment-engaging and collecting means provided thereon, a supporting means effective to sustain said collecting frame at one point thereof from the carriage frame, another supporting means effective to sustain said collecting frame from said carriage frame at another point spaced from said first-mentioned point along the line of carriage movement, both supporting points constituting the basis of support for the collecting frame and determining the normal operating position thereof, both said supporting means being constructed and prearranged in a manner to permit the raising relative to the carriage of the frame portions associated with the respective supporting means in response to a corresponding urge exerted upon said collecting frame.

12. In a sediment-collecting reciprocating mechanism for settling tanks, a carriage adapted to travel along the top portion of the tank, a sediment-collecting frame supported from the carriage so as to be movable between operative and inoperative positions, means for pivotally supporting said frame at one point thereof from the carriage, and means for pivotally supporting said frame at another point spaced from said first-mentioned point along the line of carriage movement, both said supporting means constructed and prearranged in a manner to permit said frame to execute substantially upward angular movements alternately about the respective supporting pivots.

13. A sediment conveying reciprocating mechanism for settling tanks, which comprises a carriage adapted to travel along the top portion of the tank, an angular frame fulcrumed at its apex portion upon the carriage and depending therefrom into the tank, a sediment collecting element provided at one end of said frame, a hooking connection for anchoring the opposite end of said frame relative to the carriage, and means for automatically unhooking the connection at one end of carriage travel.

14. A sediment conveying mechanism according to claim 13, with the addition of guide means effective to control the drop of the anchored end when being disconnected.

15. In combination with an elongated sedimentation tank having a bottom outlet in one section of the tank and having a rear end section, between which bottom outlet and rear end section sediment deposits upon the bottom, said rear end section also having embodied therein a contact portion adapted to have camming engagement with the lower portion including a sediment engaging screed, of a sediment conveying frame such as hereinafter mentioned, said rear end section of the tank furthermore having a rounded bottom corner portion by which the rear wall transitionally merges into the bottom of the tank; a sediment collecting mechanism comprising a carriage operable in reciprocating fashion in a predetermined path along the top portion of the tank and substantially between said bottom outlet and said rear end section of the tank for sediment collecting operation such as hereinafter described, a sediment conveying frame pivotally suspended from said carrier and depending from its pivot point into the tank and operable between angular positions in a manner to convey sediment along the tank bottom while travelling in the one direction and to run idle in the other direction, and having a lower extreme portion including a sediment engaging screed such as referred to above, which sediment conveying frame mounted to be yieldingly maintained against return to operative position and thus to be held in substantially predetermined position during its idle travelling movement with the screed swung up from the bottom and projecting in the direction of such movement, said lower portion of the sediment conveying frame thus being positioned to enter into camming relationship with said contact portion as the carrier approaches the said rear end section of the tank, and to cause the frame to yield from its idle position in a manner to effect the gradual return of the frame to operative position, said screed thus being caused by virtue of the carrier movement and by virtue of said camming engagement to descend into and substantially follow the contour of said rear bottom corner portion; automatically responsive mechanism effective with respect to said frame and said carrier to engage and retain said frame in operative angular position relative to the carrier and to the tank bottom; and means including a controlled release for said mechanism effective to establish said frame in its in-operative angular position.

NELS B. LUND.